(12) United States Patent
Kasai et al.

(10) Patent No.: US 10,016,831 B2
(45) Date of Patent: Jul. 10, 2018

(54) WIRE ELECTRIC DISCHARGE MACHINE

(71) Applicant: FANUC Corporation, Yamanashi (JP)

(72) Inventors: Hirotsugu Kasai, Yamanashi (JP); Yoshinori Makino, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 208 days.

(21) Appl. No.: 14/674,024

(22) Filed: Mar. 31, 2015

(65) Prior Publication Data
US 2015/0273601 A1  Oct. 1, 2015

(30) Foreign Application Priority Data
Apr. 1, 2014  (JP) .................... 2014-075655

(51) Int. Cl.
| | | |
|---|---|---|
| *B23H 1/08* | (2006.01) | |
| *B23H 1/10* | (2006.01) | |
| *B23H 7/36* | (2006.01) | |
| *B23H 7/02* | (2006.01) | |
| *B23H 7/10* | (2006.01) | |

(52) U.S. Cl.
CPC ............. *B23H 1/10* (2013.01); *B23H 7/02* (2013.01); *B23H 7/101* (2013.01); *B23H 7/36* (2013.01)

(58) Field of Classification Search
CPC . B23H 1/10; B23H 7/02; B23H 7/101; B23H 7/36; B23H 11/00; B23H 7/20; B23H 2600/12; G05B 2219/45221; Y10T 137/0368; Y10T 137/0379; Y10T 137/7759; Y10T 137/85986; Y10T 137/86002

USPC .......... 219/69.14; 137/565.17, 487.5, 486, 137/624.11, 10, 12, 565.11, 565.13; 700/282; 222/52, 71; 141/83, 94–95, 141/198
See application file for complete search history.

(56) References Cited

U.S. PATENT DOCUMENTS

| | | | | |
|---|---|---|---|---|
| 3,646,808 A | * | 3/1972 | Leonard .................. | E21B 21/08 175/40 |
| 5,047,149 A | * | 9/1991 | Vion ........................ | C02F 1/24 210/127 |

(Continued)

FOREIGN PATENT DOCUMENTS

| | | |
|---|---|---|
| EP | 0667202 A1 | 8/1995 |
| JP | 4-261746 A | 9/1992 |

(Continued)

OTHER PUBLICATIONS

Decision to Grant a Patent in JP Patent Application No. 2014-075655, dated Apr. 5, 2016.

(Continued)

*Primary Examiner* — Tu B Hoang
*Assistant Examiner* — Joseph Baillargeon
(74) *Attorney, Agent, or Firm* — Hauptman Ham, LLP

(57) ABSTRACT

A wire electric discharge machine is provided with a storage unit configured to store the flow rate of a machining fluid delivered to a sealing portion in a machining tank in association with the flow rate of the machining fluid delivered to a nozzle. The flow rate of the machining fluid delivered to the nozzle is measured, and the flow rate of the machining fluid to be supplied to the sealing portion is read from the flow rate storage unit and set, based on the measured flow rate.

10 Claims, 3 Drawing Sheets

(56) References Cited

U.S. PATENT DOCUMENTS

| | | | |
|---|---|---|---|
| 5,081,332 A * | 1/1992 | Sakuragawa | B23H 1/10 |
| | | | 219/69.12 |
| 5,416,289 A | 5/1995 | Tanaka | |
| 6,831,245 B1 * | 12/2004 | Koba | B23H 7/02 |
| | | | 219/69.12 |
| 8,680,422 B2 * | 3/2014 | Yoshida | B23H 7/04 |
| | | | 219/69.12 |
| 2005/0023195 A1 | 2/2005 | Kita et al. | |
| 2006/0237915 A1 | 10/2006 | Kita et al. | |
| 2013/0092661 A1 | 4/2013 | Yoshida et al. | |
| 2014/0083536 A1 | 3/2014 | Yoshizaki et al. | |

FOREIGN PATENT DOCUMENTS

| | | | | |
|---|---|---|---|---|
| JP | 4-322914 A | 11/1992 | | |
| JP | 7-60550 A | 3/1995 | | |
| JP | 8-1443 A | 1/1996 | | |
| JP | 9-216130 A | 8/1997 | | |
| JP | 9-253944 A | 9/1997 | | |
| JP | 2005-46984 A | 2/2005 | | |
| JP | 2006-297570 A | 11/2006 | | |
| JP | 5166586 B1 * | 3/2013 | | B23H 7/04 |
| JP | 2013-86190 A | 5/2013 | | |
| JP | 2014-61574 A | 4/2014 | | |
| JP | 2015-77646 A | 4/2015 | | |

OTHER PUBLICATIONS

Office Action dated Sep. 8, 2015, corresponding to Japanese Patent Application No. 2014-075655.
Extended European Search Report dated Aug. 6, 2015, corresponding to European patent application No. 15160844.5.

* cited by examiner

WIRE ELECTRIC DISCHARGE MACHINE

RELATED APPLICATIONS

The present application claims priority to Japanese Application Number 2014-075655, filed Apr. 1, 2014, the disclosure of which is hereby incorporated by reference herein in its entirety.

BACKGROUND OF THE INVENTION

Field of the Invention

The present invention relates to a wire electric discharge machine with a machining fluid supply device.

Description of the Related Art

Conventionally, in an immersion-type wire electric discharge machine, a sealing portion for leakage prevention is provided on a sidewall portion of a machining tank penetrated by an arm through which a wire electrode is passed. Generally, in a wire electric discharge machine such as a wire-cut electric discharge machine, a machining fluid is supplied at a constant rate to the sealing portion of the machining tank (see Japanese Patent Application Laid-Open No. 2006-297570).

Japanese Patent Application Laid-Open No. 8-1443 discloses a method in which a flow sensor disposed in a fluid supply passage is used to detect the flow rate of a machining fluid supplied from a clean water tank to an electric discharge machining part, and the speed of a filter pump is inverter-controlled so that the flow rate of the machining fluid supplied from a dirty tank to the clean water tank is slightly higher than that of the machining fluid supplied to the machining tank. In this method, the machining fluid is supplied only from the machining fluid supply passage that is used during electric discharge machining.

Japanese Patent Application Laid-Open No. 2005-46984 discloses a method in which fluid surface level detecting means attached to a clean water tank is used to obtain the discharge rate of a filter pump based on a difference in height with respect to a reference fluid surface position, in order to prevent early clogging of a filter, and the discharge rate of the filter pump is controlled so that the fluid surface position is restored to the reference position. However, this document does not describe how early clogging of the filter is prevented by reducing the flow rate of a machining fluid supplied from the clean water tank to a machining tank to reduce the flow rate of the machining fluid flowing into the filter.

Japanese Patent Application Laid-Open No. 9-216130 discloses a technique in which a flow regulating valve is provided for adjusting the flow rate of a machining fluid supplied to a machining tank attached to a machining fluid supply pipe and the open/close operation of the flow regulating valve is controlled in response to information from a machining tank fluid surface sensor.

Japanese Patent Application Laid-Open No. 4-322914 discloses a technique in which a concentration of sludge in a machining tank is detected and if the detected concentration is higher than a preset value, then a circulating liquid and a machining fluid are increased in amount to reduce the sludge concentration.

An example of a machining fluid supply device of a conventional wire electric discharge machine will now be described with reference to FIG. 3.

Conventionally, in an immersion-type wire electric discharge machine, a sealing portion 4 for leakage prevention is provided on a sidewall portion of a machining tank 3 penetrated by an arm through which a wire electrode is passed. A machining fluid in the machining tank 3 is discharged into a dirty tank 2 through a drain portion 15. The machining fluid discharged from the machining tank 3 into the dirty tank 2 contains machining chips of a workpiece and the wire electrode generated by electric discharge machining. The machining fluid is supplied from a clean water tank 1 to the machining tank 3. The machining fluid to be supplied to the clean water tank 1 is supplied from the dirty tank 2 through a filtration filter 5. The filtration filter 5 removes the machining chips from the machining fluid supplied from the dirty tank 2 to the clean water tank 1. A machining fluid pump 7 draws up the machining fluid from the clean water tank 1 and supplies it to nozzles (not shown) of the machining tank 3. A controller 6 drivingly controls the machining fluid pump 7 through an inverter 11$b$.

In controlling a filter pump 8 through an inverter 11$a$ in association with the surface position of the machining fluid in the clean water tank 1 and the amount of the machining fluid used in the tank 1, the machining fluid flows excessively to the sealing portion 4 so that the fluid level of the clean water tank 1 is easily reduced if the supply of the machining fluid to the sealing portion 4 by a feed water pump 9 is constant. Thus, the machining fluid flows at too high a flow rate from the dirty tank 2 to the clean water tank 1 through the filtration filter 5.

Since a pressure applied to the filtration filter 5 is proportional to the square of the filter flow rate, it easily increases if the supply of the machining fluid to the sealing portion 4 is constant. Thus, there is a problem that the service life of the filter 5 is reduced.

SUMMARY OF THE INVENTION

Accordingly, in consideration of the above-described problems of the prior art techniques, the object of the present invention is to provide a wire electric discharge machine, capable of reducing the flow rate of a machining fluid discharged out of a clean water tank so that the load on a filtration filter is reduced, thereby extending the service life of the filter.

A first aspect of a wire electric discharge machine according to the present invention comprises a machining tank having therein an electric discharge machining part configured to perform electric discharge machining of a workpiece by means of a wire electrode, a dirty tank in which a machining fluid in the machining tank is collected and stored, a filtration filter configured to filter machining chips of the workpiece and the wire electrode generated by the electric discharge machining from the machining fluid in the dirty tank and supply the filtered machining chips to a clean water tank, a sealing portion configured to prevent the machining fluid from flowing out of the machining tank through an opening in the machining tank, a feed water pump configured to deliver the machining fluid in the clean water tank to the sealing portion, a nozzle through which the machining fluid is jetted against the workpiece during the electric discharge machining, and a machining fluid pump configured to deliver the machining fluid in the clean water tank to the nozzle. The wire electric discharge machine further comprises a measurement unit configured to measure the flow rate of the machining fluid delivered to the nozzle, a flow rate storage unit stored with the flow rate of the machining fluid delivered to the sealing portion in association with the flow rate of the machining fluid delivered to the nozzle, a flow rate setting unit configured to read the flow rate of the machining fluid delivered to the sealing portion from the flow rate storage unit and set the read flow rate, based on the flow rate measured by the measurement unit, and a flow rate control unit configured to control the flow rate of the machining fluid supplied to the sealing portion based on the flow rate set by the flow rate setting unit.

The measurement unit may comprise a flow rate measuring section configured to measure the flow rate of the machining fluid delivered to the nozzle, a pressure detecting section configured to measure the pressure of the machining fluid delivered to the nozzle, a velocity measuring section configured to measure the flow velocity of the machining fluid delivered to the nozzle, or a distance measuring section configured to measure the distance between the nozzle and the workpiece.

The flow rate of the machining fluid delivered to the sealing portion, which is stored in the flow rate storage unit, may be set to zero if the flow rate of the machining fluid delivered to the nozzle is higher than a predetermined value, if the pressure of the machining fluid delivered to the nozzle is lower than a predetermined pressure, or if the flow velocity of the machining fluid delivered to the nozzle is higher than a predetermined value.

A second aspect of the wire electric discharge machine according to the present invention comprises a machining tank having therein an electric discharge machining part configured to perform electric discharge machining of a workpiece by means of a wire electrode, a dirty tank in which a machining fluid in the machining tank is collected and stored, a filtration filter configured to filter machining chips of the workpiece and the wire electrode generated by the electric discharge machining from the machining fluid in the dirty tank and supply the filtered machining chips to a clean water tank, a sealing portion configured to prevent the machining fluid from flowing out of the machining tank through an opening in the machining tank, a circulation pump configured to deliver the machining fluid in the clean water tank to the sealing portion, a nozzle through which the machining fluid is jetted against the workpiece during the electric discharge machining, and a machining fluid pump configured to deliver the machining fluid in the clean water tank to the nozzle. The wire electric discharge machine further comprises a machining condition storage unit stored with a machining condition which specifies the flow rate of the machining fluid delivered to the nozzle, a flow rate storage unit stored with the flow rate of the machining fluid delivered to the sealing portion in association with the specified flow rate of the machining fluid, a flow rate setting unit configured to read the flow rate of the machining fluid delivered to the sealing portion from the flow rate storage unit and set the read flow rate, based on the machining condition set during the machining, and a flow rate control unit configured to control the flow rate of the machining fluid supplied to the sealing portion based on the flow rate set by the flow rate setting unit.

The flow rate of the machining fluid stored in the flow rate storage unit may be proportional to the distance between the nozzle and the workpiece, the flow rate of the machining fluid, the pressure of the machining fluid, and the flow velocity of the machining fluid.

The flow rate setting unit may set the flow rate when the machining condition is changed, when the distance between the nozzle and the workpiece is changed, when the flow rate of the machining fluid is changed, when the pressure of the machining fluid is changed, when the flow velocity of the machining fluid is changed, or at each predetermined time or at predetermined time intervals.

According to the present invention, there can be provided a machining fluid supply device of a wire electric discharge machine, capable of reducing the flow rate of a machining fluid discharged out of a clean water tank so that the load on a filter is reduced, thereby extending the service life of the filter.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Figure 1:
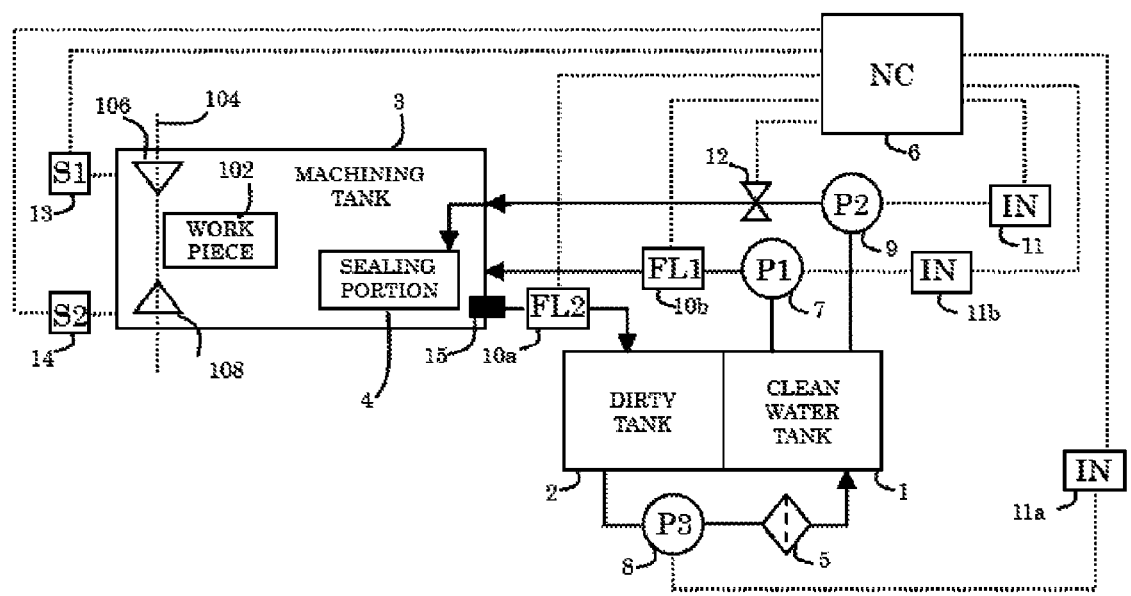
FIG. 1 is a diagram illustrating one embodiment of a wire electric discharge machine with a machining fluid supply device according to the present invention.
Figure 3:
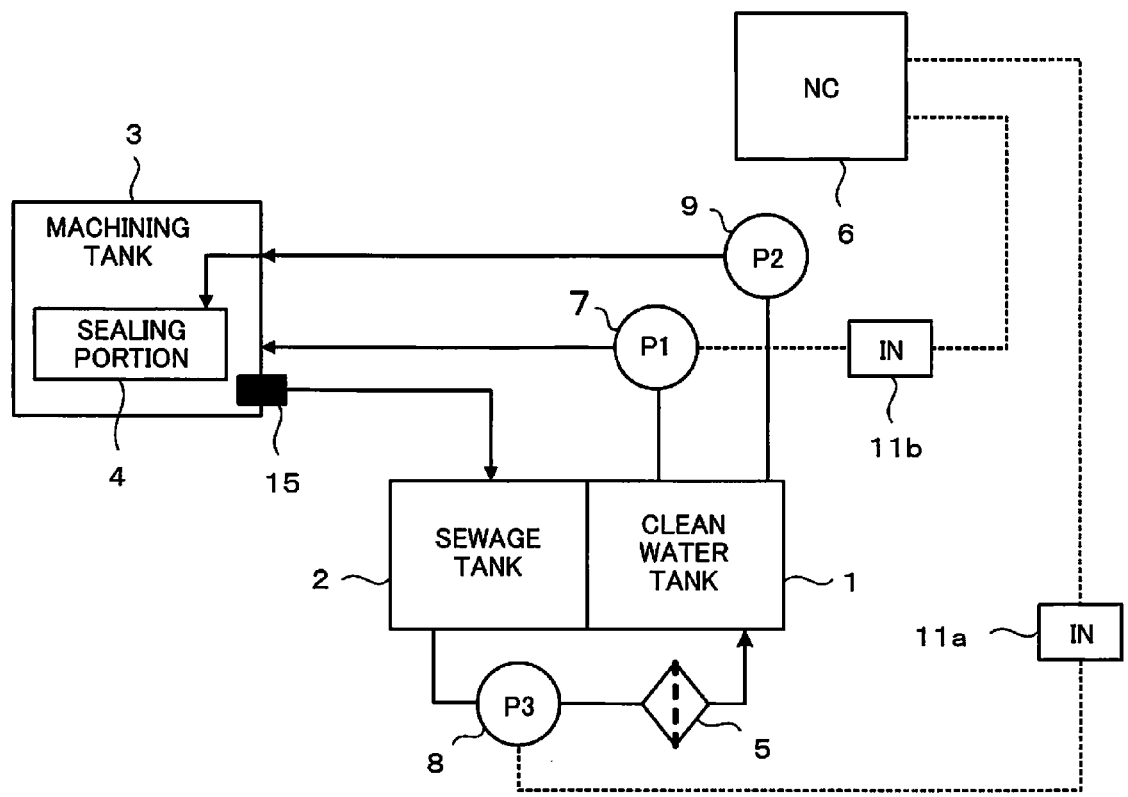
FIG. 3 is a diagram illustrating an example of a wire electric discharge machine with a conventional machining fluid supply device.

FIG. 1 is a diagram illustrating one embodiment of a wire electric discharge machine with a machining fluid supply device according to the present invention. In FIG. 1, components corresponding to the components of the prior art technique shown in FIG. 3 are designated the same reference numerals.

In the wire electric discharge machine, a workpiece 102 is placed in a machining tank 3, and a wire electrode 104 and the workpiece 102 are moved relative to each other for electric discharge machining as a voltage is applied between them. A controller 6 is a numerical controller for controlling the entire wire electric discharge machine including the machining fluid supply device. In FIG. 1, the controller 6 is shown as a controller for controlling the machining fluid supply device.

A sealing portion 4 for leakage prevention is provided on a sidewall portion of a machining tank 3 penetrated by an arm (not shown) through which the wire electrode is passed. Further, the machining tank 3 is fitted with a level sensor 13 for measuring the level of a machining fluid stored in the machining tank 3 and a pressure sensor 14 for measuring the pressure of the machining fluid. The respective outputs of the level sensor 13 and the pressure sensor 14 are delivered to the controller 6.

The machining fluid in the machining tank 3 is discharged out of it through a drain portion 15. The machining fluid discharged from the machining tank 3 contains machining chips of the workpiece and the wire electrode generated by electric discharge machining. To measure the flow rate of the machining fluid flowing out from the machining tank 3 to a dirty tank 2, a flowmeter 10a is attached to a duct that connects the machining tank 3 and the dirty tank 2. The output of the flowmeter 10a is delivered to the controller 6. A velocity meter may be used in place of the flowmeter 10a.

The machining fluid is discharged into the dirty tank 2 through the drain portion 15. The machining fluid discharged from the machining tank 3 into the dirty tank 2 contains machining chips of the workpiece and the wire electrode generated by electric discharge machining. The machining fluid containing the machining chips collected in the dirty tank 2 is drawn up by a filter pump 8 and delivered to a clean water tank 1 through a filtration filter 5. The filtration filter 5 removes the machining chips from the machining fluid supplied from the dirty tank 2 to the clean water tank 1. The controller 6 drivingly controls the filter pump 8 through an inverter 11a.

The machining fluid stored in the clean water tank 1 is drawn up by a machining fluid pump 7 and supplied to nozzles 106-108. As is generally known, wire electric discharge machining is performed in such a manner that the wire electrode 104 is passed through and run between a pair of opposite (e.g., upper and lower) nozzles 106-108 with respect to the workpiece 102 disposed between the nozzles 106-108. When this is done, the machining fluid is jetted from the nozzles 106-108 in order to remove the machining chips from a machining area.

The controller 6 drivingly controls the machining fluid pump 7 through an inverter 11b. A flowmeter 10b is attached to a duct that extends between the machining fluid pump 7 and the machining tank 3. The flowmeter 10b measures the flow rate of the machining fluid drawn up from the clean water tank 1 by the machining fluid pump 7 and supplied to the machining tank 3. The output of the flowmeter 10b is delivered to the controller 6. A velocity meter may be used in place of the flowmeter 10b. Means for measuring the flow rate of the machining fluid delivered to the nozzles is not limited to the flowmeter 10b or the velocity meter and may alternatively be pressure detecting means for detecting the pressure of the machining fluid delivered to the nozzles. Further, distance measuring means for measuring the distance between the workpiece and the nozzles may be used instead, since there is a correlation between this distance and the flow rate of the machining fluid delivered to the nozzles.

Furthermore, the machining fluid stored in the clean water tank 1 is drawn up by a feed water pump (circulation pump) 9 and supplied to the sealing portion 4 of the machining tank 3. The controller 6 drivingly controls the feed water pump 9 through an inverter 11c. Also, a valve 12 is attached to a duct that extends between the feed water pump 9 and the sealing portion 4 of the machining tank 3. The controller 6 can perform open/close control of the valve 12, thereby controlling the supply of the machining fluid from the sealing portion 4 to the clean water tank 1.

The function of the controller 6 of FIG. 1 will now be described with reference to FIGS. 2A and 2B.

Figure 2A:
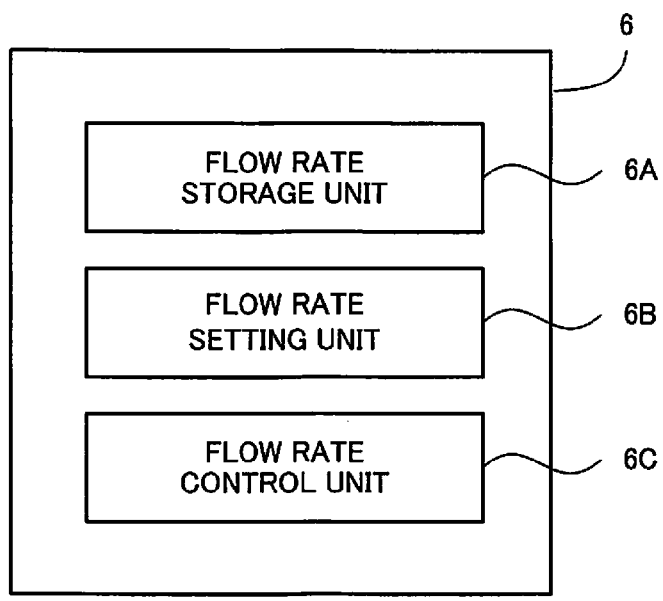
FIGS. 2A and 2B are diagrams illustrating the function of a controller shown in FIG. 1.

A first example of the controller 6 shown in FIG. 2A comprises a flow rate storage unit 6A, flow rate setting unit 6B, and flow rate control unit 6C.

The flow rate storage unit 6A stores the flow rate of the machining fluid delivered to the sealing portion 4 in association with that of the machining fluid delivered to the nozzles. The flow rate setting unit 6B reads the flow rate of the machining fluid delivered to the sealing portion 4 from the flow rate storage unit 6A and sets it, based on the measured flow rate. The flow rate control unit 6C controls the flow rate of the machining fluid supplied to the sealing portion 4 based on the flow rate set by the flow rate setting unit 6B. The flow rate of the machining fluid supplied to the sealing portion 4 can be controlled by controlling the inverter 11c by means of the flow rate control unit 6C.

Further, a second example of the controller 6 shown in FIG. 2 comprises a machining condition storage unit 6D, flow rate storage unit 6A, flow rate setting unit 6B, and flow rate control unit 6C.

The machining condition storage unit 6D stores a machining condition that specifies the flow rate of the machining fluid delivered to the nozzles. The flow rate storage unit 6A stores the flow rate of the machining fluid delivered to the sealing portion 4 in association with that of the machining fluid delivered to the nozzles. The flow rate setting unit 6B specifies the flow rate of the machining fluid corresponding to machining conditions set during machining, from the machining condition storage unit 6D. Then, the flow rate setting unit 6B reads the flow rate of the machining fluid corresponding to the specified flow rate and delivered to the sealing portion 4, from the flow rate storage unit 6A and sets the read flow rate. The flow rate control unit 6C controls the flow rate of the machining fluid supplied to the sealing portion 4 based on the flow rate set by the flow rate setting unit 6B. The flow rate of the machining fluid supplied to the sealing portion 4 can be controlled by controlling the inverter 11c by means of the flow rate control unit 6C.

Figure 2B:
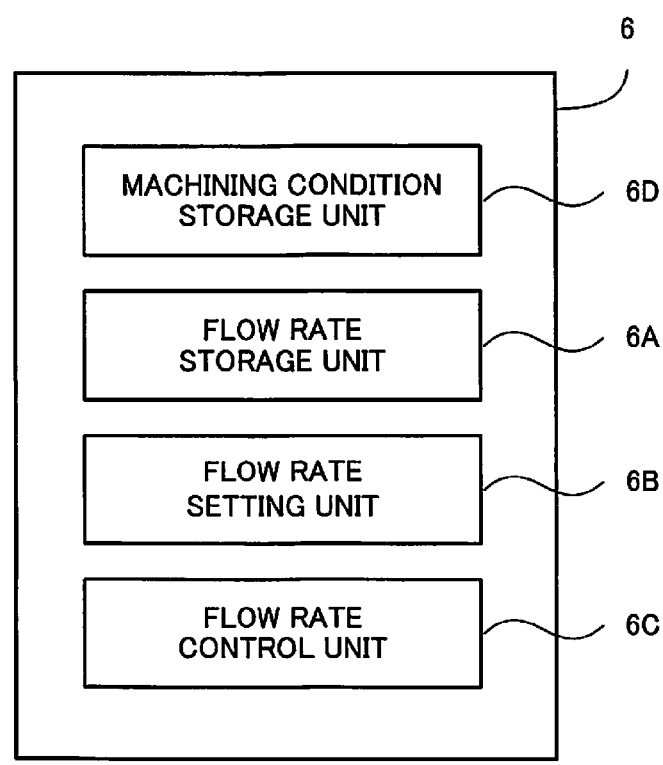

The controller 6 shown in FIGS. 2A and 2B controls the replenishment of the machining fluid supplied to the sealing portion 4 in the machining tank 3, based on the machining conditions, the distance between the workpiece and the nozzles, the flow rate, pressure, or flow velocity of the machining fluid discharged from the machining fluid pump 7, and physical quantities including the flow rate, flow velocity, and pressure of the machining fluid flowing from the drain portion 15 of the machining tank 3 into the dirty tank 2.

As for the value of the flow rate of the machining fluid for replenishment, values previously set corresponding to the machining conditions, the distance between the workpiece and the nozzles, and the flow rate, pressure, or flow velocity of the machining fluid are stored in advance as parameters in the storage units 6D and 6A of the controller 6. Then, during the electric discharge machining, the controller 6 automatically invokes the parameters corresponding to the machining conditions and the flow rate, pressure, or flow velocity of the machining fluid from the storage units 6D and 6A and uses them.

The distance between the workpiece and the nozzles is calculated based on the machining fluid pressure detected by the sensor, the machining fluid flow rate, standard setting of a contact or release state, and the relationship between the Z-axis coordinate and the thickness of the workpiece. Alternatively, the distance between the workpiece and the nozzles may be previously determined for each of the machining conditions so that it can be identified from the machining conditions invoked during the electric discharge machining.

The amount of replenishment for the sealing portion 4 may be extremely reduced if the flow rate of the machining fluid supplied to an electric discharge machining part is high enough to maintain the fluid level of the machining tank 3. For example, this situation may occur during roughing (generally with the machining fluid supplied at a high set flow rate to the electric discharge machining part) or open machining (with the workpiece and the nozzles kept wide apart from one another). In some cases (e.g., if the flow rate of the machining fluid is higher than a predetermined value), the replenishment may be stopped so that the flow rate storage unit 6A of the controller 6 is stored with 0 as the flow rate of the machining fluid delivered to the sealing portion 4. When the machining fluid is not supplied to the electric discharge machining part (e.g., in a non-machining state), it is necessary only that an optimal amount of replenishment just sufficient to maintain the surface level in the machining tank 3 be supplied.

If the pressure of the machining fluid delivered to the nozzles is lower than a predetermined pressure or if the flow velocity of the machining fluid delivered to the nozzles is higher than a predetermined value, the flow rate storage unit 6A of the controller 6 is stored with 0 as the flow rate of the machining fluid delivered to the sealing portion 4.

The value of the replenishment amount is invoked from the flow rate storage unit 6A when the necessary replenishment amount is changed, that is, when the machining conditions are changed, the distance between the workpiece and the nozzles is changed, or the flow rate, flow velocity, or pressure of the machining fluid flowing from the drain portion 15 into the dirty tank 2 is changed. Alternatively, the value of the replenishment amount may be invoked from the flow rate storage unit 6A at predetermined time intervals or at each predetermined time.

In this way, the service life of the filtration filter 5 can be extended by reducing the flow rate of the machining fluid discharged out of the clean water tank 1 so that the load on the filter 5 is reduced.

The invention claimed is:

1. A wire electric discharge machine comprising:
   a machining tank having therein a wire electrode movable relative to a workpiece for electric discharge machining of the workpiece as a voltage is applied between the wire electrode and the workpiece;
   a dirty tank connected to the machining tank to collect and store machining chips of the workpiece and the wire electrode and machining fluid discharged from the machining tank;
   a filtration filter that filters said machining chips of the workpiece and the wire electrode generated by the electric discharge machining from the machining fluid in the dirty tank and supply the filtered machining fluid to a clean water tank;
   a sealing portion provided on a sidewall portion of the machining tank to prevent the machining fluid from flowing out of the machining tank through an opening in the machining tank;
   a feed water pump that delivers the machining fluid from the clean water tank to the sealing portion to replenish a level of the machining fluid in the machining tank;
   a nozzle that jets the machining fluid from the clean water tank against the workpiece during the electric discharge machining;
   a machining fluid pump that delivers the machining fluid from the clean water tank to the nozzle;
   a valve attached to a duct that extends between the feed water pump and the sealing portion;
   a measurement unit that measures a flow rate of the machining fluid delivered to the nozzle; and
   a controller comprising:
      a flow rate storage unit that stores flow rates of the machining fluid to be delivered through the duct to the sealing portion, wherein each of the stored flow rates correlates with an associated flow rate of the machining fluid delivered to the nozzle as measured by the measurement unit;
      a flow rate setting unit that reads the flow rate storage unit and sets a flow rate of the machining fluid delivered to the sealing portion based on the flow rate measured by the measurement unit; and
      a flow rate control unit that controls the flow rate of the machining fluid supplied to the sealing portion by controlling the feed water pump and the valve attached to the duct based on the flow rate set by the flow rate setting unit,
   wherein the flow rate setting unit sets the flow rate of the machining fluid delivered to the sealing portion, which is stored in the flow rate storage unit, to zero
      when the flow rate of the machining fluid delivered to the nozzle is higher than a predetermined flow rate, or
      when a pressure of the machining fluid delivered to the nozzle is lower than a predetermined pressure, or
      when a flow velocity of the machining fluid delivered to the nozzle is higher than a predetermined flow velocity.

2. The wire electric discharge machine according to claim 1, wherein the measurement unit has at least one of:
   a flowmeter configured to measure the flow rate of the machining fluid delivered to the nozzle;
   a pressure sensor configured to measure the pressure of the machining fluid delivered to the nozzle;
   a velocity meter configured to measure the flow velocity of the machining fluid delivered to the nozzle; and
   a detector configured to measure a distance between the nozzle and the workpiece.

3. The wire electric discharge machine according to claim 1, wherein the flow rate of the machining fluid delivered to the sealing portion, stored in the flow rate storage unit, is proportional to a distance between the nozzle and the workpiece, the flow rate of the machining fluid delivered to the nozzle, the pressure of the machining fluid delivered to the nozzle, and the flow velocity of the machining fluid delivered to the nozzle.

4. The wire electric discharge machine according to claim 3, further comprising:
   a flowmeter attached to a duct that connects the machining tank and the dirty tank,
   wherein the flowmeter is configured to
      measure a flow rate of the machining fluid in the duct connecting the machining tank and the dirty tank, and
output the measured flow rate of the machining fluid in the duct connecting the machining tank and the dirty tank to the controller as a factor for flow rate control.

5. The wire electric discharge machine according to claim 1, wherein the flow rate control unit of the controller is configured to control the flow rate of the machining fluid delivered to the sealing portion based on the flow rate measured by the measurement unit
   when a machining condition of the electric discharge machining is changed,
   when a distance between the nozzle and the workpiece is changed,
   when the flow rate of the machining fluid delivered to the nozzle is changed,
   when the pressure of the machining fluid delivered to the nozzle is changed,
   when the flow velocity of the machining fluid delivered to the nozzle is changed, or
   at each predetermined time or at predetermined time intervals.

6. The wire electric discharge machine according to claim 1, further comprising:
   a level sensor connected to the machining tank, wherein the level sensor is configured to measure the level of the machining fluid stored in the machining tank, an output of the level sensor being input to the controller, and
   a pressure sensor connected to the machining tank, wherein the pressure sensor is configured to measure a pressure of the machining fluid stored in the machining tank, an output of the pressure sensor being input to the controller.

7. The wire electric discharge machine according to claim 1, further comprising:
   a flowmeter attached to a duct that connects the machining tank and the dirty tank,
   wherein the flowmeter is configured to measure a flow rate of the machining fluid in the duct connecting the machining tank and the dirty tank, and output the measured flow rate of the machining fluid in the duct connecting the machining tank and the dirty tank to the controller as a factor for flow rate control.

8. The wire electric discharge machine according to claim 1, further comprising:

a velocity meter attached to a duct that connects the machining tank and the dirty tank, wherein the velocity meter is configured to measure a flow velocity of the machining fluid in the duct connecting the machining tank and the dirty tank, and output the measured flow velocity of the machining fluid in the duct connecting the machining tank and the dirty tank to the controller as a factor for flow rate control.

9. The wire electric discharge machine according to claim 1, further comprising at least one of a flowmeter attached to a duct that connects the machining tank and the dirty tank, or a velocity meter attached to the duct that connects the machining tank and the dirty tank.

10. A wire electric discharge machine, comprising:

a machining tank having therein a wire electrode movable relative to a workpiece for electric discharge machining of the workpiece as a voltage is applied between the wire electrode and the workpiece;

a dirty tank connected to the machining tank to collect and store machining chips of the workpiece and the wire electrode and machining fluid discharged from the machining tank;

a filtration filter that filters said machining chips of the workpiece and the wire electrode generated by the electric discharge machining from the machining fluid in the dirty tank and supply the filtered machining fluid to a clean water tank;

a sealing portion provided on a sidewall portion of the machining tank to prevent the machining fluid from flowing out of the machining tank through an opening in the machining tank;

a feed water pump that delivers the machining fluid from the clean water tank to the sealing portion to replenish a level of the machining fluid in the machining tank;

a nozzle that jets the machining fluid from the clean water tank against the workpiece during the electric discharge machining;

a machining fluid pump that delivers the machining fluid from the clean water tank to the nozzle;

a valve attached to a duct that extends between the feed water pump and the sealing portion; and a controller comprising:

a machining condition storage unit that stores machining conditions each of which specifies a flow rate of the machining fluid delivered to the nozzle;

a flow rate storage unit that stores flow rates of the machining fluid to be delivered through the duct to the sealing portion, wherein each of the stored flow rates correlates with an associated flow rate of the machining fluid delivered to the nozzle as specified by a corresponding machining condition stored in the machining condition storage unit;

a flow rate setting unit that, based on the machining condition set during the electric discharge machining, specifies a flow rate of the machining fluid delivered to the nozzle from the machining condition storage unit, and then reads the flow rate storage unit and sets a flow rate of the machining fluid delivered to the sealing portion based on the flow rate specified from the machining condition storage unit; and a flow rate control unit that controls the flow rate of the machining fluid supplied to the sealing portion by controlling the feed water pump and the valve attached to the duct based on the flow rate set by the flow rate setting unit, wherein the flow rate setting unit sets the flow rate of the machining fluid delivered to the sealing portion, which is stored in the flow rate storage unit, to zero when the flow rate of the machining fluid delivered to the nozzle is higher than a predetermined flow rate, or when a pressure of the machining fluid delivered to the nozzle is lower than a predetermined pressure, or when a flow velocity of the machining fluid delivered to the nozzle is higher than a predetermined flow velocity.

\* \* \* \* \*